United States Patent [19]

Bitondo

[11] Patent Number: 4,483,152
[45] Date of Patent: Nov. 20, 1984

[54] MULTIPLE CHILLER CONTROL METHOD

[75] Inventor: James M. Bitondo, Seattle, Wash.

[73] Assignee: Butler Manufacturing Company, Kansas City, Mo.

[21] Appl. No.: 515,216

[22] Filed: Jul. 18, 1983

[51] Int. Cl.³ .................... F25B 7/00; F25D 17/02
[52] U.S. Cl. .............................. 62/175; 62/201; 62/228.5; 236/1 EA; 364/557
[58] Field of Search .............. 62/175, 201, 510, 228.5, 62/196.2, 157; 236/1 EA; 364/148, 152, 493, 511, 557

[56] References Cited

U.S. PATENT DOCUMENTS

| | | | |
|---|---|---|---|
| 3,400,374 | 9/1968 | Schamann | 364/418 |
| 3,555,251 | 1/1971 | Shavit | 364/148 X |
| 4,152,902 | 5/1979 | Lush | 62/157 |
| 4,210,957 | 7/1980 | Spethmann | 364/148 X |

*Primary Examiner*—Harry Tanner
*Attorney, Agent, or Firm*—Christensen, O'Connor, Johnson & Kindness

[57] ABSTRACT

A multiple chiller control system includes a temperature controller TC, a data base and optimizer DBO, and a plurality of driven-servo loops DSL1, DSL2, . . . DSLn. The temperature controller and the data base and optimizer monitor various parameters of the chilled water system. At periodic intervals, the system determines and stores the current values of these parameters. From this data, and from data determined from operator-selected signals supplied to the temperature controller, the temperature controller determines if a change in total operating capacity is required. If this determination is affirmative, the temperature contoller supplies a request for a system capacity adjustment to the data base and optimizer, which then proceeds to select the chillers to be operated and to adjust the capacity of the chillers so selected. In doing so, the data base and optimizer refers to a data base consisting of a matrix for each chiller that has stored therein chiller coefficient of performance values that are periodically updated to reflect actual chiller operation. The data base and optimizer uses an investigation of its data base to determine that combination of chillers and the operating capacity of each that will provide an optimum system coefficient of performance in meeting the requirement for a system capacity adjustment and correspondingly provides start/stop signals and desired operating capacity signals to the driver-servo loops which responsively provide capacity adjustment signals to the chillers.

14 Claims, 6 Drawing Figures

Fig. 3.

TOC (TONS)         TCN = 75°F

| COC1 (TONS) | 50 | 100 | 150 | 200 | 250 | 300 | 350 | 400 |
|---|---|---|---|---|---|---|---|---|
| 25 | .60 | .61 | .61 | .61 | X | X | X | X |
| 50 | .63 | .64 | .65 | .65 | .64 | X | X | X |
| 75 | X | .69 | .68 | .67 | .65 | X | X | X |
| 100 | X | .74 | .76 | .78 | .79 | .8 | X | X |
| 125 | X | X | .78 | .8 | .83 | .86 | X | X |
| 150 | X | X | .84 | .85 | .84 | .86 | .83 | X |
| 175 | X | X | X | .89 | .90 | .88 | .87 | X |
| 200 | X | X | X | .91 | .90 | .89 | .88 | .87 |

TOC (TONS)         TCN = 75°F

| COC2 (TONS) | 50 | 100 | 150 | 200 | 250 | 300 | 350 | 400 |
|---|---|---|---|---|---|---|---|---|
| 25 | .50 | .51 | .54 | .50 | X | X | X | X |
| 50 | .55 | .58 | .59 | .61 | .60 | X | X | X |
| 75 | X | .68 | .69 | .69 | .70 | .73 | X | X |
| 100 | X | .70 | .72 | .75 | .76 | .77 | X | X |
| 125 | X | X | .78 | .81 | .79 | .80 | X | X |
| 150 | X | X | .84 | .87 | .84 | .83 | .80 | X |
| 175 | X | X | X | .90 | .91 | .87 | .86 | X |
| 200 | X | X | X | .89 | .90 | .91 | .87 | .83 |

Fig. 4.

MULTIPLE CHILLER CONTROL METHOD

FIELD OF THE INVENTION

This invention generally relates to methods for controlling multiple chillers of the variable-capacity type that form part of a chilled water system for a building, and more particularly relates to such a method that optimizes the efficiency of the chilled water system be selecting the chillers to be operated and by varying the operating capacity of each chiller so selected.

BACKGROUND OF THE INVENTION

Chilled water systems are commonly used to provide air conditioning in medium to large buildings. Such chilled water systems typically include multiple chillers disposed within the building at a central location, a plurality of heat exchangers disposed throughout the building at locations where air conditioning is to be accomplished, and a cooling tower disposed at a location that is exposed to the outside air. The chillers are coupled with the cooling tower by a condenser water loop, and with the heat exchangers by a chilled water loop. The basic components of each chiller are an evaporator that is coupled with the chilled water loop, a condenser that is coupled with the condenser water loop, and a compressor that intercouples the evaporator and condenser. Chilled water that is supplied to the chilled water loop by the evaporator absorbs building heat or "load" in the heat exchangers and is returned to the evaporator by the chilled water loop, with the absorbed heat being removed from the chilled water by the evaporator. The compressor converts an energy input, typically that of electrical energy, into a corresponding mechanical/thermal force that moves the absorbed heat from the evaporator to the condenser. The condenser transfers this absorbed heat to the condenser water which is circulated by the condenser water loop to and through the cooling tower, wherein the absorbed heat is transferred to the outside air, and which is then returned to the condenser. In many chilled water systems, the chillers are of the variable capacity type such as centrifugal, screw and absorption chillers whose operating capacity (measured in tons or Btu/hr) are varied by a throttle or other actuator that responds to a capacity adjustment signal. The capacity of centrifugal and screw chillers are controlled by regulating the refrigerant gas flow therein to maintain a desired chilled water temperature, and the capacity of absorption variable-capacity chillers are controlled by modulating the steam or hot water flow into a generator to maintain a desired chilled water temperature.

Chilled water systems are designed so that the maximum system capacity can accommodate worst-case conditions, that is, the highest outside air temperature, the highest humidity, and the largest building load to be encountered, taking into consideration also down-time of one or more chillers due to maintenance and equipment failure. As a result, the maximum system capacity is usually larger than that required on an average load day. Accordingly, the chilled water is typically operated at a capacity less than the maximum system capacity by selecting the chillers to be operated and by varying the capacity of the chillers so selected.

Typically, the selection of the chillers to be operated and adjustment of their capacity is done manually and is based on a number of factors such as building policy, the available operators, and their experience and equipment familiarity. It is highly impractical, however, for such manual control to achieve optimum efficiency of the chilled water system. Accordingly, the present invention is directed to a multiple chiller control method that optimizes the efficiency of a chilled water system by selecting the chillers to be operated and by varying the capacity of the chillers so selected without resort to manual control.

SUMMARY OF THE INVENTION

Briefly, the invention resides in a method for maintaining, at an optimum, the overall efficiency of a chilled water system for a building that includes multiple variable-capacity chillers. The method comprises the steps of:

providing a data base including multiple matrices, each matrix being associated with a chiller of the chilled water system and having stored therein chiller coefficient of performance values at locations that correspond to various values of at least the following parameters also stored in the matrix: the operating capacity of the chiller: and, the total operating capacity for the chilled water system;

determining a new total operating capacity value in response to a request for a chilled water system capacity adjustment;

investigating the data base to determine how the new total operating capacity value can be optimally apportioned among the chillers of the chilled water system by: selecting, from the matrices, those chiller coefficient of performance values corresponding to the new total operating capacity value and selecting, from the matrices, the chiller operating capacity values for the selected chiller coefficient of performance values; determining, from the selected chiller operating capacity values, those combinations of chiller operating capacity values that substantially equal the new total operating capacity value; determining, from the selected chiller coefficient of performance values, a system coefficient of performance value for each combination; selecting that one of the combinations that provides an optimum system coefficient of performance value; and adjusting the actual operating capacity of each chiller in accordance with the selected combination.

If the request for a chilled water system capacity adjustment represents an increase in total operating capacity, provision may be made for starting an additional chiller in the event that the new total operating capacity value is greater than the maximum total operating capacity value of the chillers presently in operation, or in the event that an improved system coefficient of performance can be obtained by starting an additional chiller. If the request for a chilled water system capacity adjustment represents a decrease in total operating capacity, provision may be made for stopping one of the presently-operating chillers in the event that the new total operating capacity value is less than the maximum total operating capacity value of the remaining chillers and an improved system coefficient of performance can be provided by the remaining chillers.

Preferably, various operating parameters for each chiller are monitored. The data base may be repetitively updated by: determining a present chiller operating capacity value for each operating chiller from the present values of the various operating parameters therefor;

determining a present total operating capacity value from the present chiller operating capacity values; determining a new chiller coefficient of performance value for each operating chiller from the present values of the various operating parameters therefor; determining an updated chiller coefficient of performance value for each operating chiller from the new chiller coefficient of performance value therefor and from the chiller coefficient of performance value stored in the matrix therefor at a location corresponding to the present chiller operating capacity value and to the present total operating capacity value; and, storing the updated chiller coefficient of performance value in that location.

Preferably, the various operating parameters that are monitored included: the temperature differential across the chiller's evaporator; the flow rate through the chiller's evaporator; and, the work input to the chiller.

BRIEF DESCRIPTION OF THE DRAWINGS

The invention can best be understood by reference to the following portion of the specification, taken in conjunction with the accompanying drawings in which:

FIG. 3 is a schematic illustration of a matrix stored in the data bank and optimizer for each chiller and used for chiller control;

FIG. 4 is a schematic illustration of specific portions of those matrices for first and second chillers.

DESCRIPTION OF A PREFERRED EMBODIMENT

Figure 1:
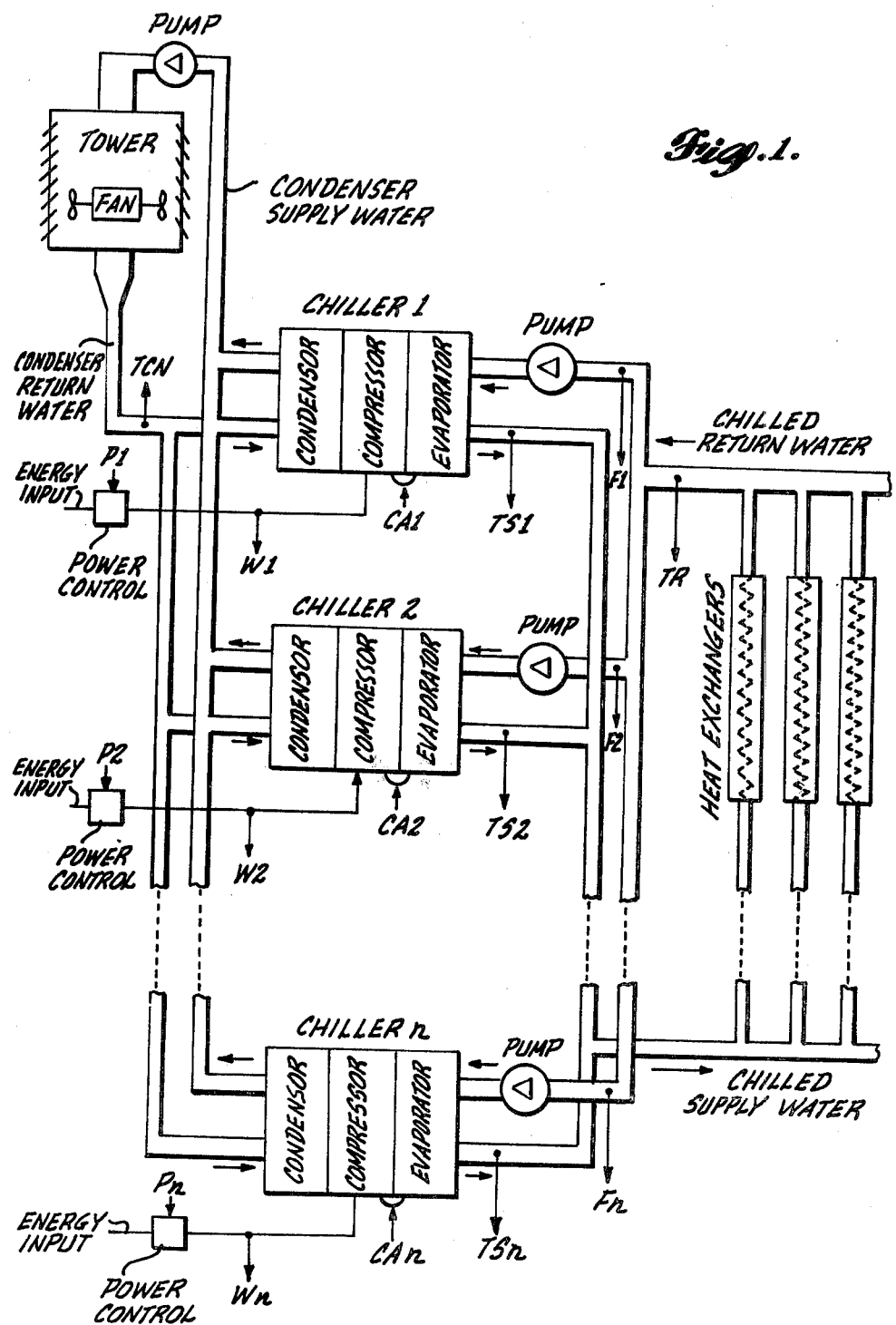
FIG. 1 is a schematic diagram of a typical chilled water system including multiple chillers, and particularly illustrating the parameters monitored and controlled by a multiple chiller control system using the method of the present invention.

Referring now to FIG. 1, a typical chiller water system includes chillers 1, 2, . . . n. Each chiller is of the variable-capacity type and includes an evaporator, a condenser, and a compressor, with adjustment of the chiller's operating capacity being made by a throttle or other actuator responsive to a capacity adjustment signal. Thus, chillers 1, 2, . . . n respectively receive capacity adjustment signals CA1, CA2, . . . CAn that are provided by the multiple chiller control system to be described. During the time that each chiller is operating, its compressor receives an energy input from an appropriate energy source (not illustrated) such as a source of electrical energy. The starting and stopping of each chiller may be viewed for purposes of the present discussion as being controlled by a power control circuit responsive to a start/stop signal for applying electrical energy to and removing electrical energy from the chiller's compressor. Thus, power control circuits are illustrated for chillers 1, 2, . . . n and respectively receive start/stop signals P1, P2, . . . Pn from the multiple chiller control system to be described.

The chiller condensers are connected in parallel with a cooling tower (including a fan and heat exchanger) by means of a condenser water loop, in which condenser supply water is conducted from each condenser to the cooling tower through piping and a pump, and in which condenser return water is conducted from the cooling tower to each condenser through piping. Likewise, the chiller evaporators are coupled in parallel with a plurality of heat exchangers by means of a chilled water loop, in which chilled supply water is conducted from each evaporator to the heat exchangers by piping, and in which chilled return water is conducted from the heat exchangers to each evaporator by piping and a plurality of pumps, one for each chiller.

Using the method of the present invention, the multiple chiller control system discussed hereinafter not only selects the chillers to be operated by provision of start/stop signals thereto, but also varies the operating capacity of each chiller so selected by supplying capacity adjustment signals thereto, in a manner that maintains the overall efficiency of the chilled water system at an optimum while maintaining the chilled supply water at a temperature sufficient to meet the building load.

In order to meet this objective, the multiple chiller control system monitors various parameters of the chilled water system as follows: the temperature of the chilled supply water provided by each evaporator, through the use of conventional temperature sensors disposed in those branches of the chilled water loop coming from the evaporators and providing chilled supply water temperature signals TS1, TS2, . . . TSn; the temperature of the chilled return water, as measured by a temperature sensor disposed in that portion of the chilled water loop coming from the heat exchangers and providing a system chilled return water temperature signal TR; the mass flow rate of the chilled return water returning to each evaporator, as measured by head plate meters or other conventional mass flow rate sensors disposed in those branches of the chilled water loop going to the evaporators and providing corresponding chilled return water flow rate signals F1, F2, . . . Fn; and, the work input to each chiller's compressor, as measured by watts transducers or other conventional power sensors determining the power supplied to each compressor's motor and providing corresponding work input signals W1, W2, . . . Wn. In addition, the temperature of the condenser return water is measured by an appropriate temperature sensor that provides a condenser return water temperature signal TCN.

Figure 2:
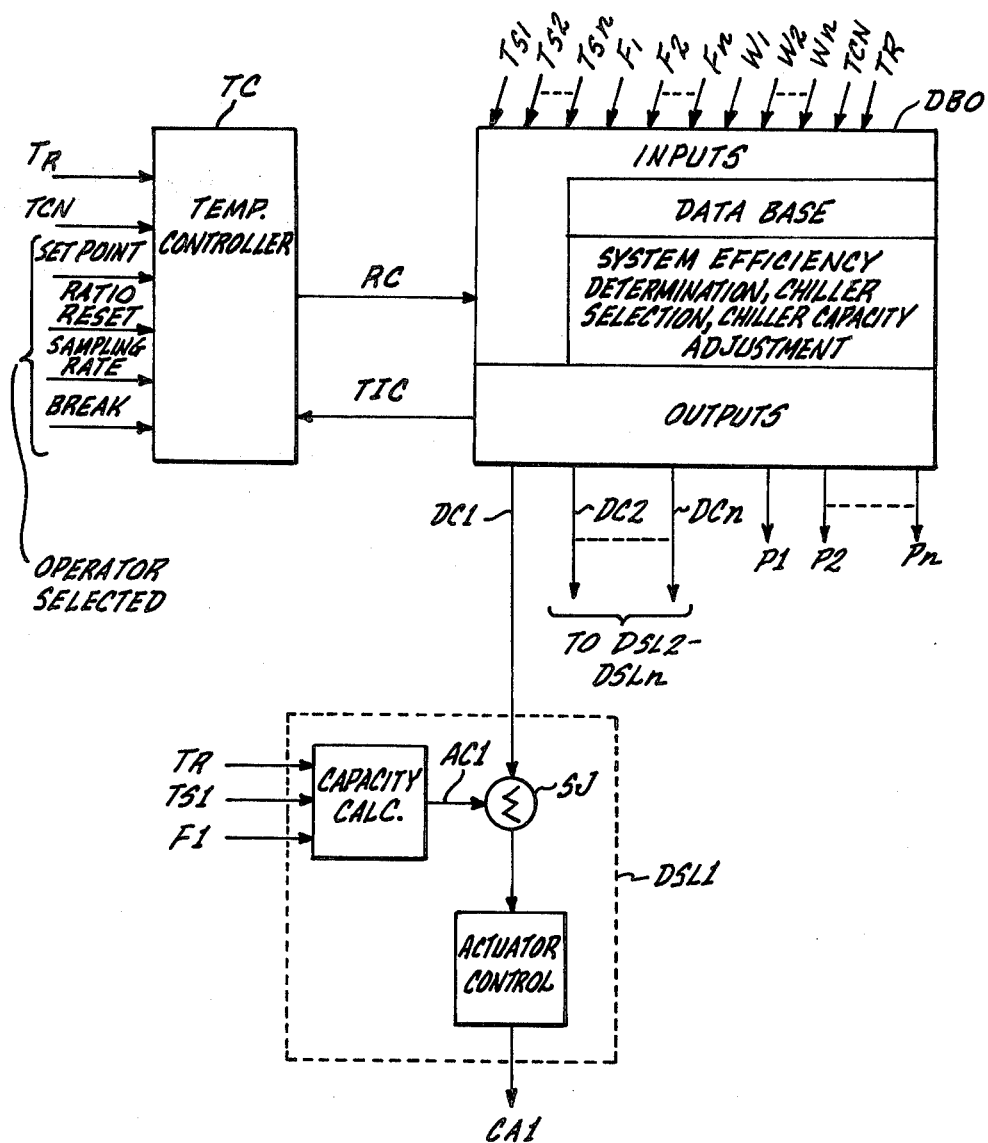
FIG. 2 is a block diagram of the multiple chiller control system including a temperature controller, a data bank and optimizer, and a plurality of driver-servo loops.

The aforementioned signals representing measured and controlled parameters are coupled to the multiple chiller control system illustrated in FIG. 2 by means of various interface circuits, not illustrated.

In general, the multiple chiller control system implements the method of the present invention in the following manner. At periodic intervals, the system determines and stores the current values of the measured parameters. From this data and from data determined from operator-selected signals supplied thereto, the system determines if a change in total operating capacity of the chilled water system is required. If this determination is affirmative, the system proceeds to select the chillers to be operated and to adjust the capacity of the chillers so selected. In doing so, the system refers to a data base consisting of a matrix for each chiller that has stored therein efficiency-related data that is periodically updated to reflect actual operation of the chillers by using data determined from the measured parameters. The system uses an iterative investigation of its data base to determine that combination of chillers and the operating capacity of each that will provide optimum system efficiency in meeting the requirement for increased or decreased chilling capacity and correspondingly provides start/stop signals and capacity adjustment signals as previously described to effect the required system capacity adjustment.

Referring additionally now to FIG. 2, the major components of the multiple chiller control system are a temperature controller TC, a data base and optimizer DBO, and a plurality of driver-servo loops DSL1, DSL2, . . . DSLn (with only loop DSL1 being illustrated in FIG. 2). Preferably, temperature controller TC and data base and optimizer DBO are implemented as part of a programmed data processor, whereas each of the driver-servo loops is preferably implemented as discrete digital and/or analog hardware.

As inputs, temperature controller TC receives the system chilled return water temperature signal TR, the condenser return water temperature signal TCN, and a signal TIC from the data base and optimizer DBO representing the present maximum system capacity which is the sum of the maximum capacities of the chillers presently in operation. In addition, temperature controller TC receives various operator-selected input signals consisting of a SET POINT signal, a RATIO RESET signal, a SAMPLING RATE signal, and a BREAK signal. The output from temperature controller TC is an RC signal representing an adjustment (either an increase or a decrease) to the total operating capacity of the system, expressed in terms of a percentage of the present maximum system capacity represented by signal TIC.

At periodic intervals determined by the SAMPLING RATE signal, e.g., every two to ten minutes, temperature controller TC determines a control point error by determining the difference between the system chilled water return temperature represented by signal TR and an operator-selected set point temperature represented by the SET POINT signal. Concurrently with determination of control point error, the time integral of the control point error over the interval established by the SAMPLING RATE signal is determined and is used along with the present maximum system capacity represented by signal TIC to determine and output a required adjustment, e.g., either an increase or decrease, in total operating capacity by means of corresponding signal RC. Temperature controller TC also modifies the set point represented by the SET POINT signal in inverse proportion to the measured condenser return water temperature represented by signal TCN, using a proportionally constant represented by the operator-selected RATIO RESET signal. Accordingly, the set point is lowered as the condenser return water temperature increases, and vice versa, so that the controller more quickly responds to the external load imposed on the building represented by the condenser return water temperature. The variation of the set point with condenser return water temperature occurs, however, only between lower and upper, condenser return water temperature "break points" that are empirically determined by the operator and that are selected by the BREAK signal supplied to temperature controller TC.

Those skilled in the art will recognize that temperature controller TC is a velocity controller that undertakes its control actions only at predetermined intervals so that the chilled water system may complete each system capacity adjustment in a stable before undertaking another and successive system capacity adjustment.

As inputs, the data base and optimizer DBO receives the system capacity adjustment signal RC, the system chilled return water temperature signal TR, the condenser return water temperature signal TCN, the chilled supply water temperature signals TS1, TS2, . . . TSn, the flow rate signals F1, F2, . . . Fn, and the work input signals W1, W2, . . . Wn. As outputs, the data base and optimizer DBO provides the maximum system capacity signal TIC, the start/stop signals P1, P2, . . . Pn, and desired operating capacity signals DC1, DC2, . . . DCn.

At periodic intervals that may be unrelated to those used by the temperature controller TC, data base and optimizer DBO monitors the input signals thereto and stores the values thereof as stored data. Data base and optimizer DBO also has stored therein the maximum operating capacity of each chiller and other chiller related data to be described hereinafter. Each time that the input signals are monitored, data base and optimizer DBO performs the following functions. First, the present value of the maximum system capacity consisting of the sum of the maximum capacities of the chillers in operation is determined and transferred to temperature controller TC as signal TIC. Second, the present value of the operating capacity COC1, COC2, . . . COCn of each chiller in operation is determined and stored by multiplying the flow rate through the chiller's evaporator (e.g., the flow rate represented by signal F1) by the temperature differential across the evaporator (e.g., the difference between the temperatures represented by signals TR and TS1). Third, the present value of the total operating capacity TOC is determined by summing the present values of the operating capacities of the chillers in operation and is stored.

Figure 3:
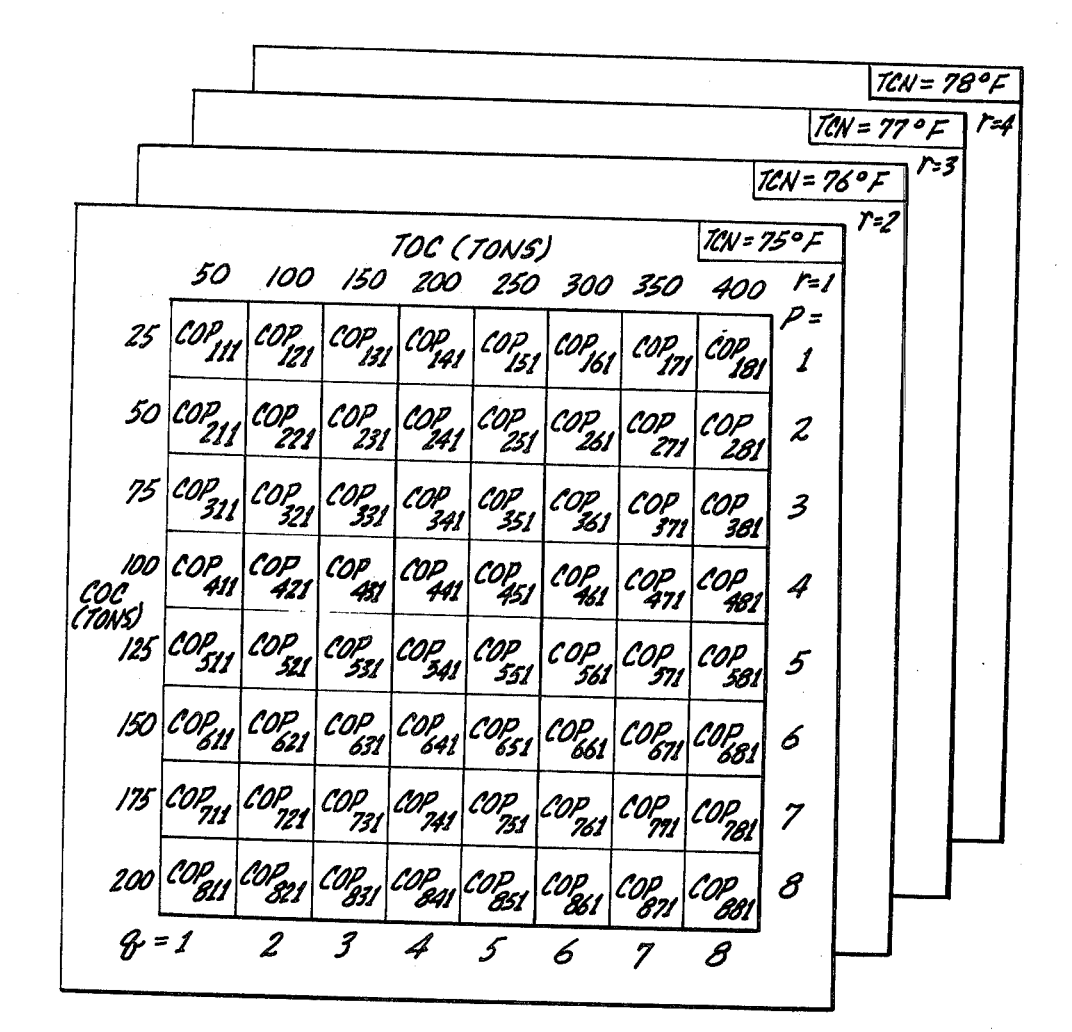

Data base and optimizer DBO includes a data base consisting of a plurality of matrices of chiller efficiency data, one matrix for each chiller. FIG. 3 illustrates the matrix for one such chiller. It will be noted that each matrix stores therein data at locations that correspond to three parameters also stored in the matrix: the condenser return water temperature TCN; the total operating capacity TOC; and, the chiller operating capacity COC. In the representation of FIG. 3, each portion or "sheet" of the matrix has stored therein data at locations corresponding to the total operating capacity TOC and the chiller operating capacity COC for a single condenser return water temperature TCN. The storage locations in the matrix may be visualized as being grouped by indices p representing the chiller operating capacity COC, q representing the total operating capacity TOC, and r representing the condenser return water temperature TCN.

The efficiency-related data that is stored in the chiller matrix is the coefficient of performance COP that is determined by data base and optimizer DBO by multiplying the temperature differential across the chiller's evaporator by a conversion constant, multiplying the result by the flow rate through the chiller's evaporator, and dividing the result by the work input to the chiller.

Thus, for the nth chiller and given conversion constant Kn for the nth chiller, $$COP_{pqr(n)} = \frac{Kn(TR - TSn) * Fn}{Wn} \quad (1)$$

which is stored at the p location in the matrix representing the present value of COC, at the q location in the matrix representing the present value of TOC, and at the r location in the matrix representing the present value of TCN.

In effecting the determination and storage of each coefficient of performance in the foregoing manner, data base and optimizer DBO uses the present values of the measured parameters TR, TSn, Fn and Wn and the present values of the chiller's COC, the TOC, and the TCN.

When the multiple chiller control system is first installed, each matrix is loaded with initial coefficient of performance values that are empirically selected by the operator. Over an extended period of chilled water system operation, data base and optimizer DBO updates these initial coefficient of performance values so that each matrix contains efficiency-related data determined from actual chiller operating conditions. Preferably, the coefficient of performance that is stored in the matrix at each update is a weighted average of the "new" or determined coefficient of performance and the "old" or previously stored coefficient of performance. Thus, $$\text{Updated } COP = (\text{New } COP*N1) + (\text{Old } COP*N2) \quad (2)$$

where N1 and N2 are weighting constants.

In addition to providing the foregoing functions, data base and optimizer DBO is responsive to each system capacity adjustment signal RC from temperature controller TC to select the chillers to be operated and to vary the capacity of the chillers so selected. Upon receipt of any such system capacity adjustment signal RC, data base and optimizer DBO first converts the percentage increase or decrease of the maximum system capacity represented by signal RC into a system operating capacity adustment $\Delta$ TIC and then determines a new total operating capacity TOC by summing the system operating capacity adjustment with the present total operating capacity. Thus, $$\text{New } TOC = \Delta TIC + \text{Old } TOC \quad (3)$$

The next task of the data base and optimizer DBO is to determine how the new total operating capacity can be best apportioned among the chillers of the chilled water system without impairing the overall efficiency of the chilled water system. The overall efficiency of the chilled water system is represented by a system coefficient of performance which is equal to the sum of the coefficients of performance of the chillers presently in operation or to be operated, scaled in proportion to their respective maximum capacities. Thus, $$COP_{system} = (M1*COP1) + (M2*COP2) \ldots + (Mn*COPn) \quad (4)$$

where $$Mn = \frac{COC_{max(n)}}{TIC}$$

Let it be assumed that the new TOC is less than the maximum system capacity that can be provided by the chillers in operation. In this event, data base and optimizer DBO determines if the required system capacity adjustment can be apportioned among the chillers presently operating without a decrease in the system coefficient of performance. In doing so, data base and optimizer DBO first selects the sheet in each chiller matrix corresponding to the present condenser return water temperature TCN. Then, data base and optimizer DBO finds the column in each selected corresponding to the new total operating capacity, reads therefrom the coefficient of performances values, and stores those coefficient of performance values by their corresponding chiller operating capacity. From this data, data base and optimizer DBO next determines all combinations of the chiller operating capacities that will meet the new total operating capacity and the system coefficient of performance for each such combination. If the highest such system coefficient of performance is greater than the present system coefficient of performance, data base and optimizer DBO then selects the chiller operating capacities corresponding to that system coefficient of performance and takes appropriate control actions as described hereinafter.

An example will illustrate the operation of data base and optimizer DBO in apportioning an increase in system operating capacity among presently operating chillers. Let it be assumed that: chiller 1 and chiller 2 are presently operating; each chiller has a maximum capacity of 200 tons (accordingly, $M1 = M2 = 0.5$, reference relation (4)); the "old" or present total operating capacity is 150 tons, equally apportioned among chillers 1 and 2 (COC1 = COC2 = 75 tons); the condenser return water temperature TCN = 75° F.; and, a capacity adjustment signal RC is received from temperature controller TC representing an increased capacity of 100 tons so that the "new" total operating capacity is 250 tons.

Referring now to FIG. 4, representative sheets for chillers 1 and 2 at the given condenser return water temperature TCN are illustrated. It should be noted that the coefficient of performance values set forth in the matrices of FIG. 4 are for purposes of illustration only and are not intended to represent the actual coefficients of performance of any chiller. It should be further noted that each matrix will include "blank" data at certain locations therein representing chiller operating capacities and total operating capacities at which it is not feasible to operate the chiller.

Initially, data base and optimizer DBO lists of coefficients of performance for each chiller and the corresponding chiller operating capacities by searching and addressing the column in each sheet corresponding to the new total operating capacity. Under the given assumptions, these coefficients of performance represent those in the 250 ton TOC column in each sheet. For purposes of convenience, the listed data is reproduced below as the chiller operating capacity COC1 and the corresponding coefficient of performance COP1 for chiller 1 and as the chiller operating capacity COC2 and the corresponding coefficient of performance COP2 for chiller 2.

TABLE I

| Chiller 1 | | Chiller 2 | |
|---|---|---|---|
| COC1 | COP1 | COC2 | COP2 |
| 50 | .64 | 50 | .60 |
| 75 | .65 | 75 | .70 |
| 100 | .79 | 100 | .76 |
| 125 | .83 | 125 | .79 |
| 150 | .84 | 150 | .84 |
| 175 | .90 | 175 | .91 |
| 200 | .90 | 200 | .90 |

Using these lists, data base and optimizer DBO then determines all possible combinations of the chiller operating capacities that equal the new total operating capacity, which combinations are illustrated below.

TABLE II

| Combination | COC1 | COC2 | New TOC |
|---|---|---|---|
| 1 | 50 | 200 | 250 |
| 2 | 75 | 175 | 250 |
| 3 | 100 | 150 | 250 |

TABLE II-continued

| Combination | COC1 | COC2 | New TOC |
| --- | --- | --- | --- |
| 4 | 125 | 125 | 250 |
| 5 | 150 | 100 | 250 |
| 6 | 175 | 75 | 250 |
| 7 | 200 | 50 | 250 |

For each combination, data base and optimizer DBO then determines the system coefficient of performance by use of relation (4), as indicated below.

TABLE III

| Combination | COP1 | COP2 | $COP_{System}$ |
| --- | --- | --- | --- |
| 1 | .64 | .90 | .77 |
| 2 | .65 | .84 | .745 |
| 3 | .79 | .84 | .815 |
| 4 | .83 | .79 | .810 |
| 5 | .84 | .76 | .80 |
| 6 | .90 | .70 | .80 |
| 7 | .90 | .60 | .75 |

From the foregoing, it can be seen that combination 3 provides the best system coefficient of performance ($COP_{system}=0.815$). Data base and optimizer DBO next determines if the system coefficient of performance of the selected combination is equal to or greater than the present system coefficient of performance. Assuming for purposes of discussion that the condenser return water temperature TCN has not varied since the last system capacity adjustment, the present system coefficient of performance can be seen by reference to FIG. 4 and through use of relation (4) to be 0.685. Since the new system coefficient of performance is greater than the present system coefficient of performance, data base and optimizer DBO proceeds to implement the required capacity adjustment through adjusting the operating capacities of chillers 1 and 2 in accordance with combination 3 in which the new chiller operating capacity COC1 of chiller 1 is 100 tons and the new chiller operating capacity COC2 of chiller 2 is 150 tons.

Returning now to FIG. 2, data base and optimizer DBO selects the chillers to be operated by supplying appropriate start/stop signals P1, P2, . . . Pn to the corresponding power control circuits (reference FIG. 1), and outputs the new chiller operating capacities by means of corresponding desired operating capacity signals DC1, DC2, . . . DCn to corresponding driver-servo loops DSL1, DSL2, . . . DSLn.

Considering driver-servo loop DSL1 as an example, this loop includes a capacity calculation circuit that receives the system chilled return water temperature signal TR, the chilled supply water temperature signal TS1, and the flow rate signal F1. From these signals, the capacity calculation circuit determines the actual operating capacity of chiller 1 and outputs that actual operating capacity as corresponding signal AC1 to a first input of a comparator SJ. Desired operating capacity signal DC1 from data base and optimizer DBO is supplied to a second input of comparator SJ, whereby the output signal from comparator SJ is a capacity error signal that is supplied to an actuator control of driver-servo loop DSL1. The actuator control functions to convert the capacity error signal into the corresponding capacity adjustment signal CA1 that is supplied to the throttle or other actuator of chiller 1 (reference FIG. 1). Chiller 1 responds to capacity adjustment signal CA1 by responsively increasing or decreasing its capacity until the actual operating capacity signal AC1 is equal to the desired operating capacity signal DC1, at which time the capacity of chiller 1 will be substantially equal to the new operating capacity that has been determined by data base and optimizer DBO. In order to provide for system stability, each driver-servo loop is designed so that any capacity adjustment of a chiller in response to a system capacity adjustment signal RC is accomplished long before the provision of a successive system capacity adjustment signal.

Figure 5A:
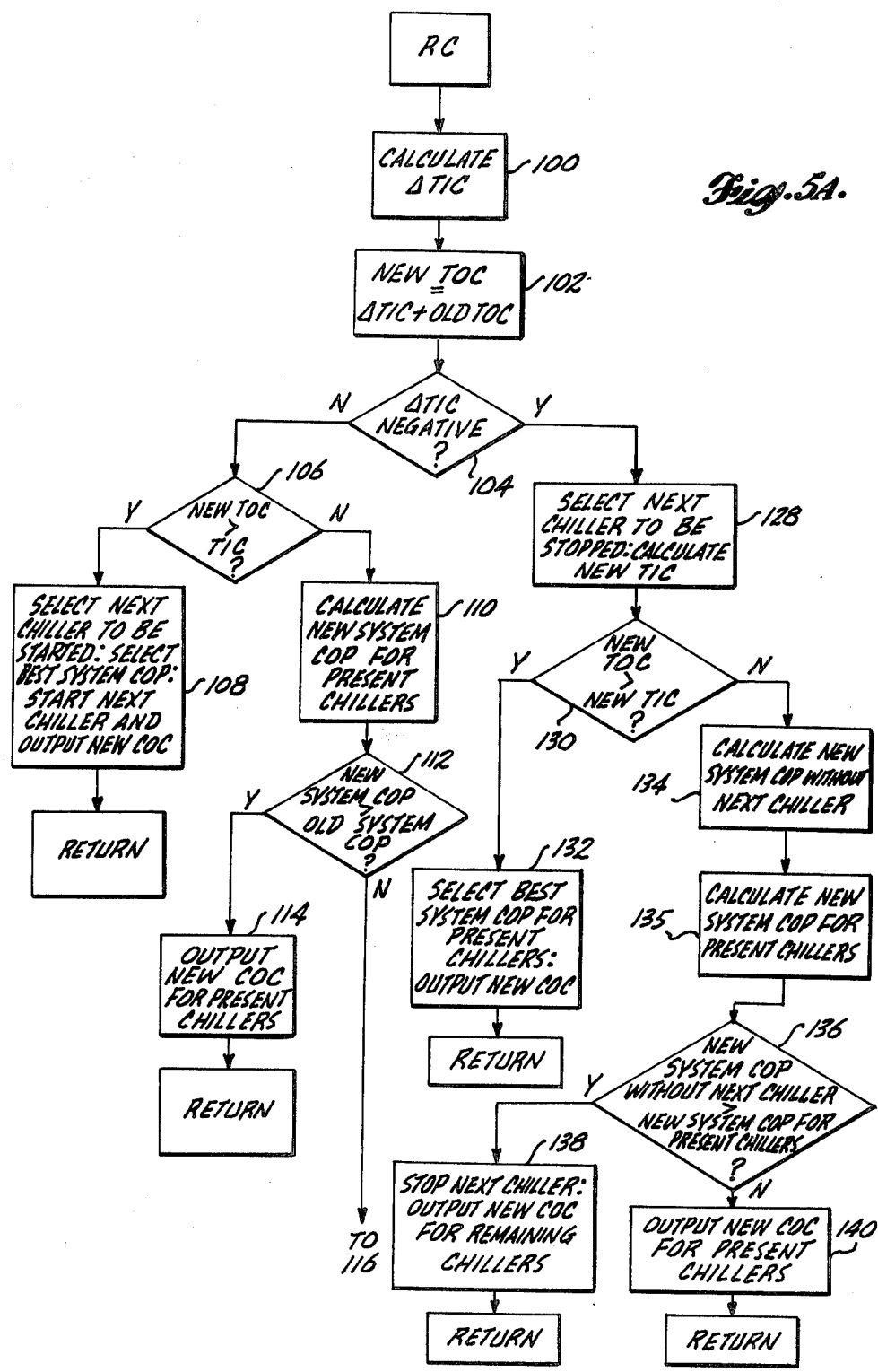
FIGS. 5A and 5B are a flow chart illustrating the operation of the data bank and optimizer.
Figure 5B:
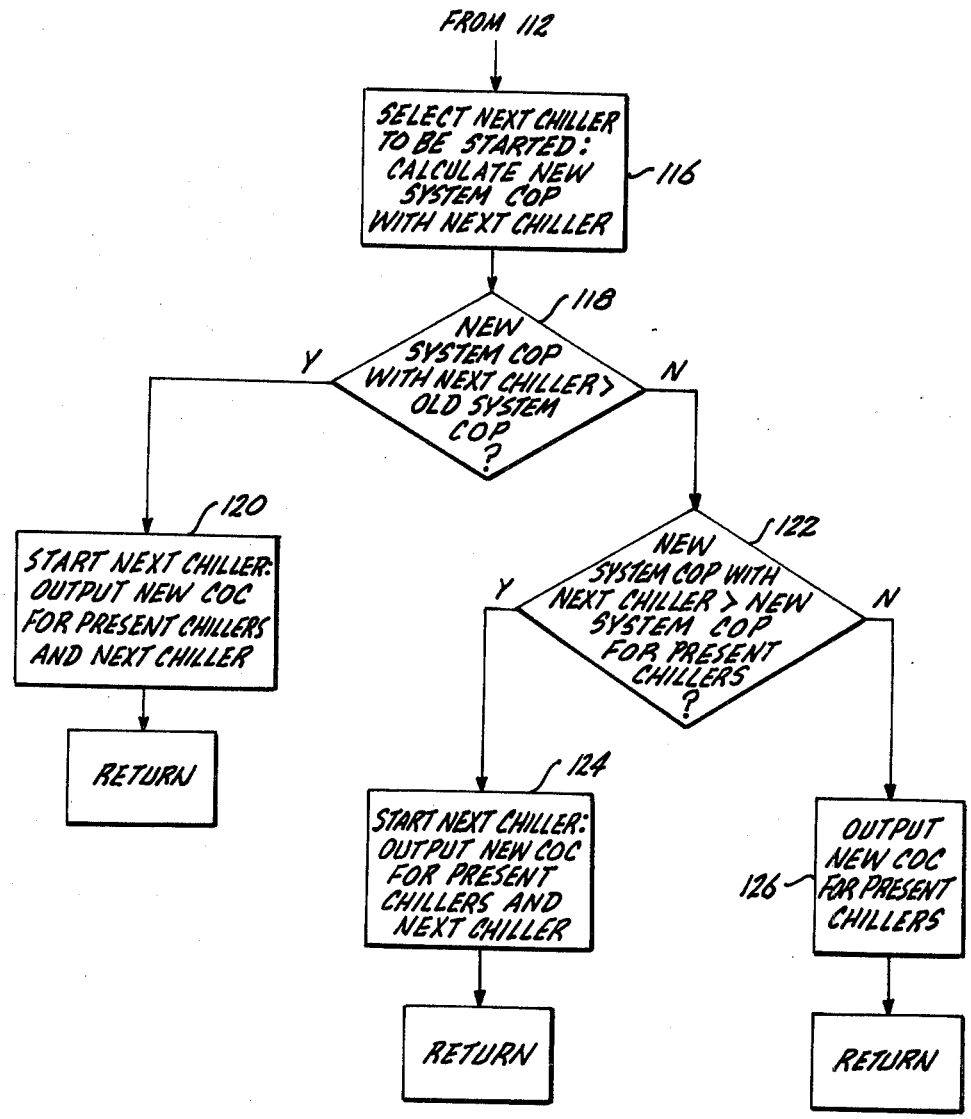

To this point, the operation of data base and optimizer DBO has been described with reference to the following events: temperature controller TC has requested an increase in total operating capacity; the requested increase can be met by the chillers presently in operation; and, the increase n total operating capacity results in an improved system coefficient of performance. Data base and optimizer DBO, however, is capable of selecting the chillers to be operated and of apportioning the required system capacity adjustment amont the selected chillers in a manner that will accommodate many other events as will be apparent from consideration of the flow chart of FIGS. 5A–5B.

Upon receipt of a system capacity adjustment signal RC, data base and optimizer DBO first converts the percentage increase or decrease of the maximum system capacity represented by signal RC into the system operating capacity adjustment Δ TIC, in step 100, and then determines a new total operating capacity TOC by summing the system operating capacity adjustment with the present total operating capacity, in step 102. In step 104, data base and optimizer DBO determines if Δ TIC is negative. If the determination in step 104 is negative, an increase in the total operating capacity is required, whereby data base and optimizer DBO proceeds, in step 106, to determine if the new total operating capacity is greater than the present maximum system capacity. If the determination in step 106 is affirmative, another chiller must be operated to meet the new total operating capacity. Data base and optimizer DBO accordingly, in step 108, selects the next chiller to be started in accordance with a lead/lag schedule that has been previously entered into data base and optimizer DBO by the operator. Using the matrix in its data base for this next chiller and the matrices for the chillers presently operating, data base and optimizer DBO then selects the best $COP_{system}$ by the use of an iterative investigation of the matrices in a manner identical to that previously described, starts the next chiller by the provision of a corresponding one of start/stop signals P1, P2, . . . Pn, and outputs the new chiller operating capacities COC found in its iterative investigation by means of corresponding ones of desired capacity signals DC1, DC2, . . . DCn. Data base and optimizer DBO then returns and awaits another system capacity adjustment signal RC.

If the new total operating capacity is less than the present maximum system capacity and the determination in step 106 accordingly is negative, data base and optimizer DBO proceeds to determine whether it would be more efficient to apportion the increase in total operating capacity among the present chillers or among the present chillers and the next chiller to be started. In step 110, data base and optimizer DBO calculates a new system coefficient of performance for the present chillers using an iterative investigation identical to that previously described. In step 112, data base and optimizer DBO determines if the new system coefficient of performance determined in step 110 is greater than the present or old system coefficient of performance. If the determination in step 112 is affirmative, data base and optimizer DBO proceeds in step 114 to output the new chiller operating capacities for the present chillers that have been determined in its iterative investigation in step 110, and then returns to await a successive system capacity adjustment signal RC.

If the determination in step 112 is negative, data base and optimizer DBO, in step 116, selects the next chiller to be started from its lead/lag schedule and calculates a new system coefficient of performance using an iterative investigation of the matrix for the next chiller and the matrices for the present chillers. In subsequent step 118, data base and optimizer DBO determines if the new system coefficient of performance determined in step 116 is greater than the present or old system coefficient of performance. If the determination in step 118 is affirmative, data base and optimizer DBO proceeds, in step 120, to start the next chiller and to output the new chiller operating capacities for the present chillers and for the next chiller determined in the iterative investigation in step 116. Thereafter, data base and optimizer DBO returns and awaits a successive system capacity adjustment signal RC. If the determination in step 118 is negative, data base and optimizer DBO determines, in step 122, whether the new system coefficient determined in step 116 (i.e., that for a system including the next chiller) is greater than the new system coefficient of performance determined in step 110 (i.e., that for a system including the present chillers only). If the determination in step 122 is affirmative, data base and optimizer DBO proceeds, in step 124, to start the next chiller and to output the new chiller operating capacities determined in the iterative investigation in step 116. If the determination in step 122 is negative, data base and optimizer DBO proceeds, in step 126, to output the new chiller operating capacities determined in the iterative investigation in step 110. From both steps 124 and 126, data base and optimizer DBO returns and awaits a successive system capacity adjustment signal RC.

If the required system capacity adjustment is a decrease in total operating capacity and the determination in step 104 accordingly is affirmative, data base and optimizer DBO, in step 128, selects the next chiller to be stopped from its lead/lag schedule and calculates a new maximum system capacity TIC by summing the maximum operating capacities of the remaining chillers. In subsequent step 130, data base and optimizer DBO determines if the new total operating capacity is greater than the new maximum system capacity. If the determination in step 130 is affirmative, the new total operating capacity cannot be met if the next chiller were to be stopped. Accordingly, data base and optimizer DBO, in step 132, selects the best system coefficient of performance for the present chillers by an iterative investigation of their matrices, and outputs the new chiller operating capacities determined in that iterative investigation. Data base and optimizer DBO then returns and awaits a successive system capacity adjustment signal RC. If the next chiller can be stopped while yet meeting the new total operating capacity, the determination in step 130 is negative, whereupon data base and optimizer DBO, in step 134, calculates a new system coefficient of performance for a system excluding the next chiller, using only the matrices for the remaining chillers, and then, in step 135, calculates a new system coefficient of performance for a system including the present chillers.

In step 136, data base and optimizer DBO determines whether the new system coefficient of performance determined in step 134 is greater than the new system coefficient of performance determined in step 135. If the determinatin in step 136 is affirmative, data base and optimizer DBO, in step 138, stops the next chiller by the provision of the corresponding one of start/stop signals P1, P2, . . . Pn and outputs the new chiller operating capacities determined in the iterative investigation in step 134. If the determination in step 136 is negative, data base and optimizer DBO proceeds, in step 140, to output the new chiller operating capacities determined in the iterative investigation in step 135. From both steps 138 and 140, data base and optimizer DBO returns and awaits a successive system capacity adjustment signal RC.

While the invention has been described with reference to a preferred embodiment, it is to be clearly understood by those skilled in the art that the invention is not limited thereto and that the scope of the invention is to be interpreted only in conjunction with the appended claims.

The embodiments of the invention in which an exclusive property or privilege is claimed are defined as follows:

1. A method for maintaining at an optimum the overall efficiency of a chilled water system for a building, the system including multiple variable-capacity chillers, said method comprising the steps of:

providing a data base including multiple matrices, each matrix being associated with a chiller of the chilled water system and having stored therein chiller coefficient of performance values at locations that correspond to various values of at least the following parameters also stored in the matrix: the operating capacity of the chiller; and, the total operating capacity for the chilled water system;

determining a new total operating capacity value in response to a request for a chilled water system capacity adjustment;

investigating said data base to determine how said new total operating capacity value can be optimally apportioned among the chillers of the chilled water system by: from said matrices, those chiller coefficient of performance values corresponding to said new total operating capacity value and selecting, from said matrices, the chiller operating capacity values for said selected chiller coefficient of performance values; determining, from said selected chiller operating capacity values, those combinations of chiller operating capacity values that substantially equal said new total operating capacity value; determining, from said selected chiller coefficient of performance values, a system coefficient of performance value for each said combination; selecting that one of said combinations that provides an optimum system coefficient of performance value; and, adjusting the actual operating capacity of each chiller in accordance with said selected combination.

2. The method of claim 1, further comprising the steps of:

storing, in said data base, a maximum operating capacity value for each chiller;

determining, from said maximum chiller operating capacity values, a present maximum total operating capacity value for the chillers presently in operation;

storing, in said data base, a schedule representing the order in which the chillers are to be started;

in response to a request for an increase in chilled water system capacity, determining if said new total operating capacity value is greater than said present maximum total operating capacity value;

in the event that said new total operating capacity value is greater than said present maximum total operating capacity value: selecting from said schedule the next chiller to be started; investigating those matrices in said data base for the present chillers and for the next chiller to select therefrom a combination of chiller operating capacity values for the present chillers and for the next chiller that provides the best system coefficient of performance value; and, starting the next chiller and adjusting the actual operating capacities of the present chillers and of the next chiller in accordance with said combination for the present chillers and the next chiller.

3. The method of claim 2, further comprising the steps of:

in the event that said new total operating capacity value is less than said present maximum total operating capacity value: investigating those matrices in said data base for the present chillers to select that combination of chiller operating capacity values for the present chillers that provides an optimum system coefficient of performance value; and, adjusting the actual operating capacities of the present chillers in accordance with said combination for the present chillers.

4. The method of claim 2, further comprising the steps of:

storing, in said data base, a present system coefficient of performance value;

in the event that said new total operating capacity value is less than said present maximum total operating capacity value: investigating those matrices in said data base for the present chillers to select therefrom a combination of chiller operating capacity values for the present chillers that provides the best system coefficient of performance values; and, comparing said best system coefficient of performance value for the present chillers with said present system coefficient of performance value;

in the event that said best system coefficient of performance value for the present chillers is greater than said present system coefficient of performance value: adjusting the actual operating capacities of the present chillers in accordance with said combination for the present chillers.

5. The method of claim 4, further comprising the steps of:

in the event said best system coefficient of performance value for the present chillers is less than said present system coefficient of performance value: selecting from said schedule the next chiller to be started; investigating those matrices in said data base for the present chillers and for the next chiller to select therefrom a combination of chiller operating capacity values for the present chillers and the next chiller that provides the best system coefficient of performance value; and, comparing said best system coefficient of performance value for the present chillers and the next chiller with said present system coefficient of performance value;

in the event said best system coefficient of performance value for the present chillers and the next chiller is greater than said present system coefficient of performance value; starting the next chiller and adjusting the actual operating capacities of the present chillers and of the next chiller in accordance with said combination for the present chillers and the next chiller.

6. The method of claim 5, further comprising the steps of:

in the event said best system coefficient of performance value for the present chillers and the next chiller is less than said present system coefficient of performance value: comparing said best system coefficient of performance value for the present chillers and the next chiller with said best system coefficient of performance value for the present chillers;

in the event said best system coefficient of performance value for the present chillers and the next chiller is greater than said best system coefficient of performance value for the present chillers: starting the next chiller and adjusting the actual operating capacities of the present chillers and of the next chiller in accordance with said combination for the present chillers and the next chillers;

in the event said best system coefficient of performance value for the present chillers and the next chiller is less than said best system coefficient of performance value for the present chillers: adjusting the actual operating capacities of the present chillers in accordance with said combination for the present chillers.

7. The method of claim 1, further comprising the steps of:

storing, in said data base, a maximum operating capacity value for each chiller;

storing, in said data base, a schedule representing the order in which the chillers are to be stopped;

in response to a request for a decrease in chilled water system capacity: selecting from said schedule the next chiller to be stopped; determining, from said maximum operating capacity values, a maximum total operating capacity value for the remaining chillers presently operating; and, comparing said new total operating capacity value with said maximum total operating capacity value for the remaining chillers;

in the event said new total operating capacity value is greater than said maximum total operating capacity value for the remaining chillers: investigating those matrices in said data base for the present chillers to select therefrom a combination of chiller operating capacity values for the present chillers that provides the best system coefficient of performance value, and, adjusting the actual operating capacities of the present chillers in accordance with said combination for the present chillers.

8. The method of claim 7, further comprising the steps of:

in the event said new total operating capacity value is less than said maximum total operating capacity value for the remaining chillers: investigating those matrices in said data base for the remaining chillers to select therefrom a combination of chiller operating capacity values for the remaining chillers that provides the best system coefficient of performance value; investigating those matrices in said data base for the present chillers to select that combination of chiller operating capacity values for the present chillers that provides the best system coefficient of performance value; and, comparing said best system coefficient of performance value for the remaining chillers with said best system coefficient of performance value for the present chillers;

in the event said best system coefficient of performance value for the remaining chillers is greater than said best system coefficient of performance value for the present chillers: stopping the next chiller and adjusting the actual operating capacities of the remaining chillers in accordance with said combination for the remaining chillers; and, in the event said best system coefficient of performance value for the remaining chillers is less than said best system coefficient of performance value for the present chillers: adjusting the actual operating capacities of the present chillers in accordance with said combination for the present chillers.

9. The method of claim 1, further comprising the steps of:

monitoring various operating parameters for each chiller; and, repetitively updating said data base by: determining a present chiller operating capacity value for each operating chiller from the present values of said various operating parameters therefor; determining a present total operating capacity value from said present chiller operating capacity values; determining a new chiller coefficient of performance value for each operating chiller from the present values of said various operating parameters therefor; determining an updated chiller coefficient of performance value for each operating chiller from said new chiller coefficient of performance value therefor and from the chiller coefficient of performance value stored in the matrix therefor at a location corresponding to said present chiller operating capacity value and to said present total operating capacity value; and, storing said updated chiller coefficient of performance value in said location.

10. The method of claim 1, further comprising the step of monitoring the condenser return water temperature of the chilled water system;

wherein said chiller coefficient of performance values are stored in each matrix in said data base at locations that also correspond to various values of said condenser return water temperature stored in the matrix;

wherein those chiller coefficient of performance values corresponding to said new total operating capacity value and to the present value of said condenser return water temperature, and the chiller operating capacity values for said selected chiller coefficient of performance values, are selected from said matrices.

11. The method of claim 10, further comprising the steps of:

monitoring various operating parameters for each chiller; and, repetitively updating said data base by: determining a present chiller operating capacity value for each operating chiller from the present values of said various operating parameters therefor; determining a present total operating capacity value from said present chiller operating capacity values; determining a new chiller coefficient of performance value for each operating chiller from the present values of said various operating parameters therefor; determining an updated chiller coefficient of performance value for each operating chiller from said new chiller coefficient of performance value therefor and from the chiller coefficient of performance value stored in the matrix therefor at a location corresponding to said present chiller operating capacity value, to said present total operating capacity value, and to said present value of said condenser return water temperature; and, storing said updated chiller coefficient of performance value in said location.

12. The method of claims 9 or 11, wherein said various operating parameters for each chiller include: the temperature differential across the chiller's evaporator; the flow rate through the chiller's evaporator; and, the work input to the chiller.

13. The method of claim 12, wherein said temperature differential is monitored by monitoring the temperature of the chilled supply water provided by each evaporator and by monitoring the temperature of the chilled return water returning to all chillers; wherein said flow rate is monitored by monitoring the mass flow rate of the chilled return water returning to each chiller's evaporator; and, wherein said work input is monitored by monitoring the power supplied to each chiller's compressor.

14. The method of claim 1, further comprising the steps of: storing, in said data base, a maximum operating capacity value for each chiller; and, determining, from said maximum operating capacity values, a maximum total operating capacity value and, wherein said system coefficient of performance value is determined for each combination of chiller operating capacity values by scaling each chiller coefficient of performance value for the combination in proportion to the ratio of said maximum chiller operating capacity value for the associated chiller to said maximum total operating capacity, and by summing said scaled chiller coefficient of performance values.

* * * * *

UNITED STATES PATENT AND TRADEMARK OFFICE
CERTIFICATE OF CORRECTION

PATENT NO. : 4,483,152
DATED : November 20, 1984
INVENTOR(S) : James M. Bitondo

It is certified that error appears in the above-identified patent and that said Letters Patent is hereby corrected as shown below:

Title page:

| | |
|---|---|
| Abstract, | line 3: "driven-servo" should be --driver-servo-- |
| | line 12: "contoller" should be --controller-- |
| Column 1, | line 9: "be" should be --by-- |
| | line 45: "are" should be --is-- |
| | line 47: "are" should be --is-- |
| | line 50: "are" should be --is-- |
| | line 57: "down-time" should be --downtime-- |
| | line 66: "is" should be --are-- (1st occurrence) |
| | line 66: "is" should be --are-- (2nd occurrence) |
| Column 2, | line 23: ":" should be --;-- |
| Column 5, | line 63: insert "manner" after "stable" |
| Column 7, | line 29: "adustment" should be --adjustment-- |
| | line 64: insert "sheet" after "selected" |
| Column 8, | line 35: "of" should be --the-- |
| Column 10, | line 19: "amont" should be --among-- |
| Column 12, | line 5: "determinatin" should be --determination-- |
| Claim 1, | line 19: insert "selecting" after "by:" |
| Claim 14, | line 6: insert ";" after "value" |
| | line 13: insert "value" after "capacity" |

Signed and Sealed this

Fourteenth Day of May 1985

[SEAL]

Attest:

DONALD J. QUIGG

Attesting Officer   Acting Commissioner of Patents and Trademarks